US011753565B2

United States Patent
Hauru et al.

(10) Patent No.: US 11,753,565 B2
(45) Date of Patent: Sep. 12, 2023

(54) METHOD OF JOINING POLYMERIC BIOMATERIALS

(71) Applicants: Helsingin yliopisto, Helsingin yliopisto (FI); Teknologian tutkimuskeskus VTT Oy, Espoo (FI)

(72) Inventors: Lauri Hauru, Helsingin yliopisto (FI); Alistair King, Helsingin yliopisto (FI); Ilkka Kilpeläinen, Helsingin yliopisto (FI); Antti Korpela, VTT (FI); Hannes Orelma, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 623 days.

(21) Appl. No.: 16/624,918

(22) PCT Filed: Jun. 21, 2018

(86) PCT No.: PCT/FI2018/050486
§ 371 (c)(1),
(2) Date: Dec. 20, 2019

(87) PCT Pub. No.: WO2018/234638
PCT Pub. Date: Dec. 27, 2018

(65) Prior Publication Data
US 2021/0403760 A1    Dec. 30, 2021

(30) Foreign Application Priority Data

Jun. 22, 2017   (FI) ..................................... 20175596

(51) Int. Cl.
*C09J 5/06*    (2006.01)
(52) U.S. Cl.
CPC ........... *C09J 5/06* (2013.01); *C09J 2400/283* (2013.01); *C09J 2400/303* (2013.01)

(58) Field of Classification Search
CPC .. C09J 5/06; C09J 2400/283; C09J 2400/303; C09J 2489/006; C09J 5/00;
(Continued)

(56) References Cited

U.S. PATENT DOCUMENTS 3,447,956 A    6/1969   Johnson
6,824,599 B2   11/2004  Swatloski et al.
(Continued)

FOREIGN PATENT DOCUMENTS

DE    102009002978 A1    11/2009
DE    102009003011 A1    11/2009
(Continued)

OTHER PUBLICATIONS

Chua et al: Characterization of autohydrolysis aspen (*P. tremuloides*) lignins. Part 1. Composition and molecular weight distribution of extracted autohydrolysis lignin. Department of Chemical Engineering and Applied Chemistry, University of Toronto, 1979, vol. 57, pp. 1141-1149.
(Continued)

*Primary Examiner* — Francisco W Tschen
*Assistant Examiner* — Abhishek A Patwardhan
(74) *Attorney, Agent, or Firm* — Laine IP Oy

(57) ABSTRACT

According to an example aspect of the present invention, there is provided a method of joining objects of hydrophilic polymeric biomaterials. In the method, an ionic liquid is applied onto the surfaces of the objects; the surfaces are pressed together; and the ionic liquid is removed. The method produces a product that can consist to 100% of biomaterial, with no synthetic polymer or chemicals remaining in the product.

17 Claims, 2 Drawing Sheets

(58) Field of Classification Search
CPC ............ B32B 2255/02; B32B 2255/08; B32B
2260/046; B32B 2262/14; B32B 2419/00;
B32B 7/12; B32B 9/025; B32B 2255/26;
B32B 9/04; B32B 9/042; B32B 9/045;
B32B 9/047; B32B 9/06; B32B 21/02;
B32B 21/06; B32B 21/08; B32B 21/10;
B32B 21/13; B32B 21/14; B32B 27/10;
B32B 27/12; B32B 27/20; B32B 27/281;
B32B 27/285; B32B 27/32; B32B 27/34;
B32B 27/36; B32B 2250/02; B32B
2255/10; B32B 2255/12; B32B 2255/24;
B32B 2260/021; B32B 2262/02; B32B
2307/54; B32B 2307/728; B32B 2479/00;
B32B 27/40; B32B 27/42; B32B 29/005;
B32B 29/02; B32B 21/00; B32B 29/00
See application file for complete search history.

(56) References Cited

U.S. PATENT DOCUMENTS

| | | | | |
|---|---|---|---|---|
| 7,786,065 B2* | 8/2010 | Hecht | ...................... | C11D 1/62 510/303 |
| 7,919,631 B2* | 4/2011 | Buchanan | .................. | C08B 3/10 548/335.1 |
| 8,202,379 B1* | 6/2012 | DeLong | ................... | D04H 3/14 156/305 |
| 9,394,375 B2* | 7/2016 | Daly | ........................ | C08H 8/00 |
| 2006/0100323 A1 | 5/2006 | Schmidt et al. | | |
| 2008/0053613 A1 | 3/2008 | Wang et al. | | |
| 2009/0088564 A1* | 4/2009 | Luo | ......................... | C08B 1/003 536/56 |
| 2012/0073978 A1 | 3/2012 | Malkowsky et al. | | |

FOREIGN PATENT DOCUMENTS

| | | | | |
|---|---|---|---|---|
| JP | 2006152154 A | 6/2006 | | |
| JP | 2017095590 A | 6/2017 | | |
| WO | WO2008043837 A1 | 5/2008 | | |
| WO | WO-2014162062 A1 * | 10/2014 | ............. | C08B 1/003 |

OTHER PUBLICATIONS

Hauru et al: Enhancement of ionic liquid-aided fractionation of birchwood. Part 1: Autohydrolysis pretreatment. Royal Society of Chemistry, RSC Advances, 2013. vol. 3, pp. 16365-16373.

Haverhals et al: Process variables that control natural fiber welding: time, temperature, and amount of ionic liquid, Cellulose, 2012 vol. 19, pp. 13-22.

Hummel et al: Dimethyl phosphorothioate and phosphoroselenoate ionic liquids as solvent media for cellulosic materials. The Royal Society of Chemistry, Green Chemistry, Jul. 20, 2011, vol. 13, pp. 2507-2517.

King et al: Distillable Acid-Base Conjugate Ionic Liquids for Cellulose Dissolution and Processing. Angewandte Chemie, 2011, vol. 50, pp. 6301-6305.

King et al: Relative and inherent reactivities of imidazolium-based ionic liquids: the implications for lignocellulose processing applications. RSC Advances, Jun. 27, 2012, vol. 2, pp. 8020-8026.

Marsh et al: Room temperature ionic liquids and their mixtures—a review. Science Direct, Department of Chemical and Process Engineering, University of Canterbury, 2004, pp. 93-98.

Ostonen: Thermodynamic Study of Protic Ionic Liquids. Publisher School of Chemical Technology, Aalto University publication series, Doctoral Dissertations, Sep. 2017, pp. 1-82.

Parviainen et al: Predicting Cellulose Solvating Capabilities of Acid-Base Conjugate Ionic Liquids. ChemSusChem, 2013, vol. 6, pp. 2161-2169.

Phan et al: Switchable Solvents Consisting of Amidine/Alcohol or Guanidine/Alcohol Mixtures. Ind. Eng. Chem. Res., 2008, vol. 47, No. 3, pp. 539-545.

Swatloski et al: Dissolution of Cellose with Ionic Liquids. J. Am. Chem. Soc., 2002, vol. 124, No. 18, pp. 4974-4975.

Technical Research Centre of Finland (VTT): Reactive lignin for reducing the environmental impacts of wood products. ScienceDaily, Feb. 14, 2017. <www.sciencedaily.com/releases/2017/02/170214094032.htm>.

Younesi-Kordkheili et al: Acid ionic liquids as a new hardener in urea-glyoxal adhesive resins. Polymers MDPI, Feb. 24, 2016, vol. 8, No. 3, 57, pp. 1-4, 11.

* cited by examiner

METHOD OF JOINING POLYMERIC BIOMATERIALS

FIELD OF THE INVENTION

The present invention relates to treatment of polymeric biomaterials. In particular, the present invention concerns a method of joining hydrophilic polymeric biomaterials, such as wood. The present invention also relates to the use of articles obtained by the method as well as to novel uses of ionic liquids.

BACKGROUND

Wood cannot be melted or melt-processed, which limits its use in industry. Current methods of forming shapes from wood rely on carving, machining and glues. Glues are a poor substitute for forming and welding and usually produce an inferior bond with inferior resistance to environmental conditions.

Current wood glues are synthetic non-wood polymers that remain in the product and eventually degrade faster than the original wood. Conventional glues cannot be recovered and reused. The finished product constitutes synthetic polymer waste and may release volatile organic compounds (VOC).

Ionic liquids are salts that melt at low temperatures (Marsh, K. N., et al. *Fluid Phase Equilib.*, 219(1):93, 2004). Certain ionic liquids are able to dissolve cellulose and hemicellulose completely and dissolve wood partially (Swatloski, R. P., et al. *J. Am. Chem. Soc.*, 124(18):4974-4975, 2002; U.S. Pat. No. 6,824,599; WO 2008/043837). With a sufficiently high hydrogen bonding basicity, a hydrogen bonding complex is formed between cellulose hydroxyls and the anion of the ionic liquid. Furthermore, in order to produce a "good solution", decrystallization of the native cellulose is necessary, and the cation must be able to intercalate between the molecules and disperse them into a molecular dispersion. However, the formation of a "good solution" does not seem to be absolutely necessary for plasticization.

Of the other components of wood, hemicellulose is even easier to dissolve than cellulose as it is amorphous. Native lignin contains two fractions of which the more condensed, higher molar mass one does not disperse into solution, and remains a shape-retaining backbone even when the wood is subjected to ionic liquid treatment (Chua, M. G. S. Wayman, M. *Can. J. Chem.*, 57(10):1141-1149, 1979; Hauru, L., et al. *RSC Adv.*, 3:16365-16373, 2013).

Certain N-oxides are known to dissolve cellulose and partially dissolve wood, as are certain ionic liquids, and co-solvent mixtures. U.S. Pat. No. 3,447,956 describes a process wherein swellable fibrous materials are strengthened by the use of an amine oxide. In the examples of U.S. Pat. No. 3,447,956, compositions of co-solvents with NMMO (N-methylmorpholine-N-oxide) are used for strengthening of selected papers.

Haverhals et al. (*Cellulose* 19:13-22, 2012) have studied "natural fiber welding", wherein small amounts of non-volatile ionic liquids are used to dissolve the surface of cotton cloth, and it is then coagulated with excess water. U.S. Pat. No. 8,202,379 discloses a method for joining fibrous material with a molten ionic liquid-based solvent, which comprises water or alcohol as a solvent and wherein the partial dissolution of the fibrous material commences upon removal of the solvent by heating, evaporation, or exposure to vacuum. The ionic liquids of U.S. Pat. No. 8,202,379 are non-volatile and cannot be recovered by evaporation.

In DE102009003011 A1, a composition containing an ionic liquid is suggested for use as an adhesive for adhering surfaces containing natural polymers. The ionic liquid tested is non-volatile and cannot be recovered by evaporation.

Attempts to use lignin separated from black liquor of kraft pulping as a glue or as a matrix for phenol-formaldehyde resins are common, although none has reached commercialization. See for example: Technical Research Centre of Finland (VTT), *Reactive lignin for reducing the environmental impacts of wood products*. ScienceDaily, 14 Feb. 2017. <www.sciencedaily.com/releases/2017/02/170214094032.htm>.

There is a need for methods that can bypass the pulping step, avoiding issues with e.g. smell from the sulfur residues in lignin, and to achieve bonding of wood directly in situ.

SUMMARY OF THE INVENTION

It is an aim of the present invention to remove at least some of the problems relating to the art and to provide a new method of joining hydrophilic polymeric biomaterials, either together or to synthetic polymeric materials.

It is another aim to provide new uses of ionic liquids.

The present invention is based on the concept of using ionic liquids for bonding of hydrophilic polymeric biomaterials which comprise lignocellulosic components at least on their surfaces. In the method ionic liquids are applied on the surfaces of the materials so as to partially dissolve or plasticize the lignocellulosic components, such as cellulose, hemicellulose and lignin. The surfaces of the materials will form a strong bond when the surfaces are pressed together and the ionic liquid or ionic liquid-cosolvent mixture is removed or decomposed. The ionic liquid is removed preferably by evaporation or migration through the biomaterial.

According to a first aspect of the present invention, there is provided a method of joining objects of hydrophilic polymeric biomaterials, comprising the steps of adding an ionic liquid onto the surfaces of the objects and pressing the surfaces together. In an embodiment the ionic liquid is removed partially or completely.

According to a second aspect of the present invention, there is provided the use of ionic liquids in bonding together of hydrophilic polymeric biomaterials, or in bonding of hydrophilic polymeric biomaterials to other materials, such as synthetic polymeric materials.

According to a third aspect of the invention, the use of materials joined together by a method according to the present invention is contemplated for producing various articles and structures.

Embodiments of the present invention comprise the use of ionic liquids that are volatile.

More specifically, the present invention is characterized by what is stated in the independent claims.

Considerable advantages are obtained by the invention. First, the method produces a product that can be 100% biomaterial, with no synthetic polymer or "chemicals" remaining in the product. The strength obtained (0.86 $N/mm^2$, maximum 1.13 $N/mm^2$) compares favorably with the required strengths (0.8 $N/mm^2$ for softwood, 1.0 $N/mm^2$ for birch) even without optimization.

Second, few wood glues tolerate boiling conditions. The bond obtained by the method of the invention is resistant to boiling: it does not peel off after 1 h boiling, and the loss of strength is 40% in this testing setup—which is known to especially stress the bond due to the warping forces during drying, Third, the ionic liquid, in the following "IL", may be recovered and reused, unlike conventional glue, and the finished product does not constitute synthetic polymer waste, or release volatile organic compounds (VOCs).

Further features and advantages of the present technology will appear from the following description of some embodiments.

EMBODIMENTS

DEFINITIONS

Figure 1:
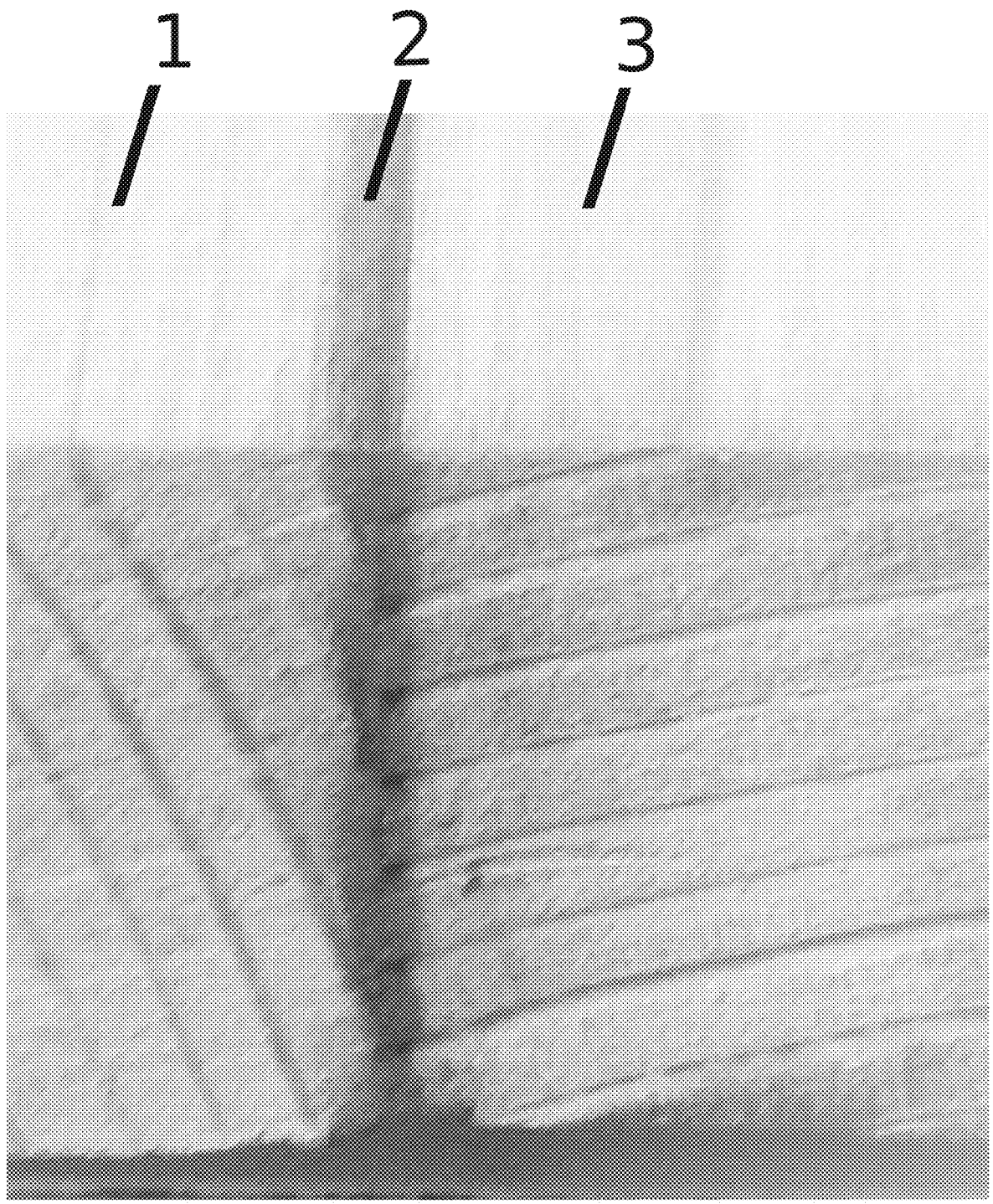
FIG. 1 illustrates the seam between two [DBNH]OAc-glued wood blocks.

In the present context, the term "hydrophilic polymeric biomaterials" includes but is not limited to porous hydrophilic biomaterials, for example fibrous materials such as wood, paper, straw, and leather, and combinations thereof, particularly wood.

In particular, the present technology, including the embodiment discussed in more detail below, is suitable for joining together solid objects of hydrophilic polymeric biomaterials, such as articles of solid wood. However, embodiments wherein solid objects of hydrophilic polymeric biomaterials are joined to synthetic polymeric materials or textiles, are also possible and within the scope of the invention.

In the present context, the term "wood" includes any kind of wood, green, dried, chemically, physically, thermally and mechanically processed wood, as well as wood processed by any combination of chemical, physical, thermal and mechanical processing. Examples include sawn wood, lumber and wood treated to impart properties of resistance to insects, microbes, mould, fungi or fire. The term "wood" also encompasses wood objects which have been processed at temperatures above 50° C., e.g. at temperatures of 70° C. to 300° C. Any thermal treatment can be carried out in the presence or absence of oxygen and steam (water vapour). Engineering wood products are also covered by the term "wood". Examples include composite objects such as multiply objects, e.g. plywood, orientated strand board, particle board, fibre boards, and objects comprising combinations of any of the above wood objects.

In the present context, the term "object" stands for any solid object having a size greater than that of a single fibre of the hydrophilic polymeric biomaterial. Typically, the present objects have a minimum dimension greater than 0.001 mm, in particular greater than 0.03 mm, for sheet-like objects and for example greater than 1.0 mm for other solid objects. In one embodiment, the objects have at least two dimensions greater than 10 mm.

The term "joining" refers to an action, akin to "gluing", in which two or more objects of a material are bonded together at an interface so that they do not separate, without the application of external force, from each other at ambient temperature and pressure and at a relative humidity of up to 100%. Preferably they cannot be separated without at least partially breaking the material as such. Thus, by joining a stable structure is formed in the sense that the objects are immobilized with respect to each other In the present context, "volatile ionic liquid" (which terms stands for the same as the expression "ionic liquids that are volatile") refers to ionic liquids that are volatile at temperatures above 50° C. at normal pressure. In particular, the cation of the ionic liquid may be the conjugate acid derived from a volatile organic superbase ("the base"), for example, 1,1,3,3-tetramethylguanidinium cation where 1,1,3,3-tetramethylguanidine is the unconjugated base, and the anion may be the unconjugated base of a volatile organic or inorganic acid ("the acid"), for example, acetate anion, where acetic acid is the conjugate acid.

Furthermore, whenever "volatile ionic liquid" is mentioned, the statement equally covers mixtures of these ionic liquids with inorganic or organic co-solvents or a mixture with an excess of the base or the acid. Volatilization may occur at any ratio or in the form of a complex, as dictated by the thermodynamics of the ionic liquid/cosolvent vapor-liquid equilibrium (Ostonen, *A. Thermodynamic Study of Protic Ionic Liquids*. D.Sc. thesis, Aalto University, 2017).

In the present context, the term "surface" stands for a region of the object through which the object is to be joined to another object. The treatment disclosed herein will typically give rise to swelling or at least partial dissolution or both of lignocellulosic components present on the surface and from the surface down to a depth of at least 0.001 mm, typically to a depth of 0.1 to 1 mm, although the effect of the ionic liquid can extend deeper into the material. However, it is generally not desired to affect the material throughout the object, and for that reason, the dissolution or swelling or both is typically restricted to a depth less than 2 mm. Thus, in the present context, the "surface" stands for the face of the object and the area of the object underneath the face down to at least 0.001 mm and to less than 2 mm.

In the present context, the term "antisolvent" is generally used for designating a liquid in which a product is not dissolved. Thus, an antisolvent does not dissolve the "objects" herein discussed.

For the sake of order, it should be pointed out that for the purpose of joining together objects according to the present invention, it is not necessary to achieve swelling or dissolution or both of lignocellulosic components on the entire surface. Generally it suffices to achieve swelling or dissolution or both in a portion of the surfaces which are placed in abutting relationship. Further, it is sufficient to achieve swelling or dissolution or both on only one of the surfaces to be placed in abutting relationship.

In the course of the treatment, fibrillation of the lignocellulosic component can also take place.

Percentages are calculated by mass (weight %).

It has been found that the application of ionic liquid onto a lignocellulosic surface of a biomaterial will achieve fibrillation and partial dissolution of at least a portion of the lignocellulosic components of the surface. Typically hemicellulose or cellulose or both are at least partially fibrillated or dissolved or both, allowing the wood surface to plasticize and conform to shape. Pressing these surfaces together will form a bond not unlike that achievable with gluing. No synthetic or external polymer is necessary, although one may be added, and the bond is not achieved through a separate layer of an added material but by the components natively present in the surface.

In embodiments, the polymer(s) solvated or swollen in the ionic liquid are subjected to desolvation, as will be explained below. The polymers entangle non-permanently with each other in solution or the swollen state, and this entanglement becomes permanent upon desolvation, thus forming a strong network entangled by tie molecules.

In an embodiment, the ionic liquid is then removed. Removal can be achieved either actively, for example by addition of antisolvent or reagent, or passively by evaporation or by migration through the biomaterial.

Thus, ionic liquids will diffuse into the adjacent materials and/or evaporate through decomposition of the ionic liquid phase, into a vapor phase composed of the base and acid components, any additional co-solvents, and/or their complexes.

In the case of a volatile ionic liquid, ionic liquid removal is preferably carried out by evaporation, for example at a temperature greater than ca. 100° C., and preferably at about 110 to 250° C. After evaporation of the bulk of the ionic liquid and desolvation of the biomass, there may be ionic liquid residue remaining. The residue may be removed by extraction with water or other liquid such as methanol or acetone.

Evaporation may be accomplished at atmospheric pressure or lower, for example by using an oven with forced air circulation (forced convection), or by using a vacuum oven (vacuum evaporation). The joining action may be accomplished at the same temperature as used for evaporation (e.g. 150° C.), or there may be a separate step at lower temperature (e.g. 120° C.) for remelting and diffusion of the ionic liquid and to ensure impregnation of the wood.

If the method of the invention includes a separate heating step before evaporation, the temperature at the heating step is lower than the evaporation temperature of the volatile ionic liquid.

In an embodiment, the volatile ionic liquid has an evaporation temperature that is greater than 50° C., in particular greater than 110° C.

In embodiments, the ionic liquid is removed by desolvation and washing with an antisolvent, by ion metathesis, by decomposing the ionic liquid by heating, by decomposing the ionic liquid with the application of a specific chemical reagent, or by decomposing the ionic liquid into components which can be collected and used again or disposed of.

In an embodiment, irrespective of how the ionic liquid is removed, it is collected after use and optionally recycled for renewed used or disposed of As stated above, in an embodiment of the invention the desolvation may be accomplished by ion metathesis, for example conversion of a cellulose-solvating ionic liquid into a non-solvating ionic liquid, e.g. [DBNH]OAc into [DBNH]NTf$_2$ with HNTf$_2$ (bis(trifluoromethylsulfonyl)imide). The IL may also be one that decomposes with heating, such as [DBUH]MeCO$_3$ (1,8-diazabicyclo[5.4.0]undec-7-enium methylcarbonate), which is synthesized from DBU, MeOH and CO$_2$. This and similar structures derived from the combination of superbases, alcohols or amines and acid gases, e.g. CO$_2$ or SO$_2$, revert to the three-component volatile starting materials on heating (Phan, L., et al., *Ind. Eng. Chem. Res.* 47(3):539-545, 2008).

Alternatively, the ionic liquid may be decomposed with the application of a specific chemical reagent. As an example, butyric acid (or pentanoic acid, or hexanoic acid) is added into [DBUH]MeCO$_3$. Metathesis gives the unstable methylcarbonic acid—which immediately decomposes into volatile CO$_2$ and MeOH—and the ionic liquid [DBUH]CH$_3$(CH$_2$)$_2$CO$_2$ (or [DBUH]CH$_3$(CH$_2$)$_3$CO$_2$, or [DBUH]CH$_3$(CH$_2$)$_4$CO$_2$). The latter is a volatile cellulose nonsolvent (King, A. W. T., et al. *Angew. Chem. Int. Ed.* 50:6301-6305, 2011). As a second example, 4-hydroxybutyric acid is added to [DBUH]MeCO$_3$. Metathesis gives the unstable methyl-carbonic acid as before and the cellulose nonsolvent [DBUH](HO)(CH$_2$)$_3$CO$_2$. On heating, the ionic liquid decomposes into DBU and 4-hydroxybutyric acid, and the latter lactonizes and evaporates as 4-butyrolactone and water.

In another embodiment, the cation portion, derived from, e.g. an amidine or a guanidine, decomposes to release the amine moieties from which they were initially prepared. The amidinium or guanidinium carbon is then either converted to simple volatile molecules, such as CO$_2$, acetic acid or formic acid, or forms a cross-link between the polymeric components, further enhancing the bonding power of the mixture. The amines or other volatile components can then be recovered and converted back into the ionic liquid or they can be disposed of.

In embodiments of the invention, the ionic liquids are salts of an organic base, such as a superbase, and an organic acid, such as a carboxylic acid. Preferably, both precursors are volatile and the IL decomposes back into the precursors on heating.

In one embodiment, the anion has a proton affinity range from −320 to −400 kcal/mol but more preferably in the range from −340 to −350 kcal/mol, such as in a carboxylate or phenolate. The unconjugated base of the cation has a proton affinity in the range between 200 and 260 kcal/mol but more preferably in the range of from 240 to 260 kcal/mol, such as superbases. The methods used to calculate these limits are demonstrated in King et al., *RSC Adv.*, 2:8020-8026, 2012 and Parviainen et al., *ChemSusChem.*, 6:2161-2169, 2013.

The organic base can be a superbase, such as a superbase selected from cyclic or acyclic amines wherein the amine nitrogen is a part of a conjugated system comprising other nitrogens, other pnictogens, or chalcogens. In particular, the superbase is an alkylated acyclic guanidium, bicyclic amidine, bicyclic guanidine or formamidine. Alternatively, the base may be non-superbasic, such as DABCO (1,4-diazabicyclo[2.2.2]octane), DMAP (4-(dimethylamino)pyridine), morpholine, or other tertiary amines.

The acid is preferably methanoic acid, ethanoic acid, propanoic acid, or alternatively alanine, other amino acid, hydrogen fluoride, phenol, alkylphenol such as a cresol, benzenediol, alkylbenzenediol, or other weak organic acid, or the conjugate acid of a phosphate, alkylated phosphate, thiophosphate, or dialkyl phosphorothioate (Hummel, M., et al., *Green Chem.* 13(9):2507, 2011). The ionic liquids formed can be for example formamidine acetate, 1,1,3,3-tetramethylguanidium O,S-dimethylphosphorothioate, [DMAPH]F, or similar combinations of the anions and cations mentioned, or mixtures of these ionic liquids.

In an embodiment of the invention, the volatile ionic liquid is [DBNH]OAc (1,5-diazabicyclo[4.3.0]non-5-enium acetate), [DBUH]OAc (1,8-diazabicyclo[5.4.0]-undec-7-enium acetate), [DMPH]OAc (1,2-dimethyl-1,4,5,6-tetrahydropyrimidinium acetate), [TMGH]OAc (1,1,3,3-tetramethylguanidinium acetate) or [MTBDH]OAc (1-methyl-1,3,4,6,7,8-hexahydro-2H-pyrimido[1,2-a]pyrimidinium acetate) or the corresponding formates or propionates (King, A. W. T. et al., 2011; Parviainen, A. et al., *ChemSusChem.* 6:2161-2169, 2013), or mixtures thereof.

In some embodiments, the ionic liquid is selected from the group of salts of an alkylated acyclic guanidine, bicyclic amidine, bicyclic guanidine, or formamidine, or DABCO (1,4-diazabicyclo[2.2.2]octane), DMAP (4-(dimethylamino)-pyridine), morpholine, or other tertiary amines, as a salt with methanoic acid, ethanoic acid, propanoic acid, or alternatively alanine, other amino acid, hydrogen fluoride, phenol, alkylphenol such as a cresol, benzenediol, alkylbenzenediol, or other organic acids, or the conjugate acid of a phosphate, alkylated phosphate, thiophosphate, and/or dialkyl phosphorothioate, and combinations thereof.

The amount of the ionic liquid, in particular volatile ionic liquid, to be added onto the surface of hydrophilic polymeric biomaterial in order to achieve a proper bonding depends on the particular biomaterials and their properties, such as porosity, and the particular ionic liquid. The amount is selected such that fibrillation/swelling or partial dissolution or several of those phenomena of at least some of the lignocellulosic components is achieved to a depth of at least 0.001 mm of the material during the joining of the objects. The ionic liquid is applied in an amount of 0.0003 to 10 g/cm$^2$, for example in an amount of 0.01 to 10 g/cm$^2$, typically in an amount of 0.02 to 0.2 g/cm$^2$.

The ionic liquid, in particular the volatile ionic liquid, may be added as such on the surface of the hydrophilic polymeric biomaterial or as a mixture or solution with an additional component. Such mixtures or solutions may contain for example:

- co-solvent or antisolvent, such as water, ethanol, butanol, tert-amyl alcohol, tetrahydrofuran, ketones, esters, lactones, or other liquids;
- excess of the conjugate base or acid, e.g. DBN in [DBNH] OAc or EtCO$_2$H in [TMGH]EtCO$_2$;
- cellulose, including but not limited to pulp, paper pulp, dissolving pulp or bacterial cellulose, microcrystalline cellulose, regenerated cellulose, nanocellulose;
- modified cellulose such as acylated, alkylated, silylated, phosphated or otherwise functionalized cellulose;
- polysaccharides, including but not limited to hemicellulose, xylan, glucomannan, non-meltable konjac (*Amorphophallus konjac*) polysaccharides, mannan or starch;
- polyols, such as glycol or glycerol;
- chitin (e.g. shell of *Crustacea*), chitosan or otherwise modified chitin;
- silk (*Bombyx mori*);
- wool (*Ovis aries, Vicugna pacos*, etc.);
- lignin, including but not limited to kraft lignin, organosolv lignin, isolated lignin such as EMAL, MWL, DWL;
- cross-linked, acylated, alkylated, etherified or otherwise modified lignin or lignin-derived phenol-formaldehyde resin;
- biomass solutions, including but not limited to solutions of wood, needles, leaves, bark, stumps, roots, such as paper mulberry bark or root fibers, or annual plant biomass such as bagasse, corncobs, Miscanthus, switchgrass, bamboo, hemp, cotton linters, flax, ramie, coconut fiber, jute, kenaf, kudzu, okra, nettle fiber, or straw; which may be treated with autohydrolysis, steam explosion, ammonolysis or other method to decrystallize and soften the biomass; and then possibly functionalized by e.g. alkylation, acylation or other functionalization;
- pulp and/or wood or other biomass material pre-swelled and/or pretreated, for example with a ternary water/cosolvent/ionic liquid mixture, e.g. [DBNH]OAc/water, [TMGH]OAc/ethanol/water, [MTBDH]EtCOO/THF/water and analogous combinations, or a quaternary mixture, or a solvent mixture of higher order;
- synthetic polymers to improve bonding;
- inorganic modifiers such as silicates, phosphates or borates;
- inorganic fillers and/or pigments such as calcium carbonate, silicon dioxide, aluminum oxide, titanium dioxide, sand, silt, limestone, powdered granite or other rock;
- undissolved inorganic, natural, regenerated and synthetic fibers such as viscose, Lyocell, polyester, polycotton, rubber, glass, basalt or aramid fibers;
- biocides such as algicides, fungicides, antimicrobials, insecticides or other pesticides, to protect against attack by algae, fungi, microbes, insects or other pests;
- reagents to attack and soften lignin such as sulfites, sulfides or oxidants;
- reagents to control acidity/basicity in order to prevent colourisation of wood, such as amphoteric salts, for example, sodium bicarbonate;
- reagents to acylate or alkylate hydroxyls; either to make the surface compatible to additional polymers, or to form alkylene (other -ene) crosslinks and produce a thermoset;
- additives that impart additional barrier properties, such as resistance to diffusion of oxygen, vapor or hydrophobic materials through the bond into the wood;
- reagents or polymers to plasticize the cellulose or wood.

By dissolving lignocellulosic components in the form of wood or wood components, such as hemicellulose or cellulose or both, it is possible to increase viscosity of the ionic liquid.

The solutions may be true molecular dispersions ("good solutions") or gels, microgels, suspensions possibly containing aggregates ("bad solutions"), or physical dispersions.

Alternatively, the ionic liquid or its solution may be added as a solid and remelted with a hot gas stream to accomplish the gluing action, i.e. to diffuse the ionic liquid and to ensure impregnation of the wood.

In one embodiment, the ionic liquid or its solution is applied onto the surface of the object by a coating or surface application method. Such a method includes blade coating, spray coating, curtain coating and film transfer coating. However, immersion of the object in the ionic liquid is also possible.

As mentioned above, the amount of ionic liquid or its solution applied by any of the above procedures on the surface is, before evaporation, typically 0.01 to 10 g/cm$^2$ of the surface of the object.

As will be understood, in some embodiments, the biomaterials will contain substances or components which may impair the ability of the ionic liquids to achieve swelling or dissolution of the lignocellulosic substances. Such components are typically water and other non-solvents. Thus, any water present in, for example, wood will reduce the capability of the ionic liquid to achieve swelling or dissolution, or both, of the lignocellulosic material upon application. However, by evaporation of moisture from the biomaterial after application of the ionic liquid and after the biomaterials have been placed in abutting relationship and pressed together, the ability of the ionic liquid present in the interface between the materials to achieve swelling and dissolution will gradually increase.

One embodiment comprises bonding together two or more objects of biomaterial which contain at least some water, comprising the steps of applying ionic liquid on at least one surface of two surfaces to be placed in abutting relationship; placing the surfaces of the objects in abutting relationship; pressing the objects together; increasing temperature to achieve at least partial evaporation of water; and continuing pressing until the objects are bonded together.

The method of the invention is particularly useful to bond wood, paper, straw, leather, or other porous, hydrophilic polymeric biomaterials.

The invention may thus be used to produce glued wood structures, furniture, plywood, particleboard, medium-density fiber board, hardboard, glued laminated timber, wood flooring, and parquetry, marquetry or other types of intarsia. Furthermore, the invention may be used to produce wood-synthetic polymer composite, straw-synthetic polymer composite, pulp fiber-synthetic polymer composite, including composites with fillers such as inorganic materials such as calcium carbonate, recycled textiles or other reclaimed materials.

In one embodiment of the invention wherein two or more blocks of wood are joined together or multiply wood products are produced, the wood objects are joined to each other cross-grains, i.e. with the grain of the wood on a first wood object being perpendicular to the grain of the wood on a second wood object that is placed in abutting relationship with the first wood object, adding a third wood object cross-grains on the second wood object etc.

In one embodiment, the present invention is used for joining together two or more objects composed of the same hydrophilic polymeric biomaterial.

In another embodiment, the present invention is used for joining together two or more objects, of which at least one object is composed of another material selected from the group of hydrophilic polymeric biomaterials.

In a still another embodiment, the present invention is used for joining together at least one object composed of hydrophilic polymeric biomaterial and an object composed of synthetic polymeric material or textile, possibly in the presence of a hydrophobicity modifier. Such synthetic materials can be selected from thermoplastic and thermoset polymers as well as combinations thereof, optionally containing reinforcing components, such as fibers, including natural and synthetic fibers, and fillers, for example mineral and polymeric fillers. The thermoplastic polymers can be selected from polyolefins, polyethers, polyesters, polyamides, polyimides, polyimines. Examples of thermosetting polymers include polyurethanes, polyphenols, polyformaldehydes, polymelamines. The synthetic materials can also be in the form of ready or recycled textiles, derived from regenerated natural fibres, synthetics or mixtures thereof.

The recommended strength of the bond between the objects is 1 N/mm$^2$ for birch and 0.8 N/mm$^2$ for softwood. Even without optimization, the object invention produces a maximum strength of 1.13 N/mm$^2$.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

EXPERIMENTAL

Example 1: 1.0564 g acetic acid (AcOH) was poured into 2.193 g 1,5-diazabicyclo[4.3.0]non-5-ene (DBN) and the formed ionic liquid [DBNH]OAc was poured on one side of a block of wood (18×1.8×1.8 cm), and a second block was pressed on top.

The blocks were wrapped in foil and heated for 1 h at 120° C. to diffuse the ionic liquid. The wrapping was removed and the IL evaporated out overnight at 150° C. in a ventilated oven.

FIG. 1 shows a first block of wood (1), a second block of wood (2), and a seam (3) (gluing zone) between the blocks. The bond between the blocks was of sufficient strength to resist pulling apart by hand. The seam (3) showed evidence of ionic liquid diffusion into wood. There was no residual smell of ionic liquid in the blocks.

Example 2: 1.1194 g acetic acid (AcOH) was poured into 2.1512 g 1,1,3,3-tetramethylguanidine (TMG) and the formed ionic liquid [TMGH]OAc was poured between two wood blocks and processed as in Example 1. The glued blocks were somewhat less colored by the IL treatment than with [DBNH]OAc.

Example 3: The end of a standard 1-inch shear strength testing strip (birch) was dabbed with the IL [DBNH]OAc, still hot from synthesis, made from 227µµl DBN and 105 µl AcOH. A 1×1 inch square was added cross-grains (with the grain of the wood on the strip being perpendicular to the grain of the wood on the square), the same IL amount was spread on top and a second testing strip was placed on top (FIG. 2).

Figure 2:
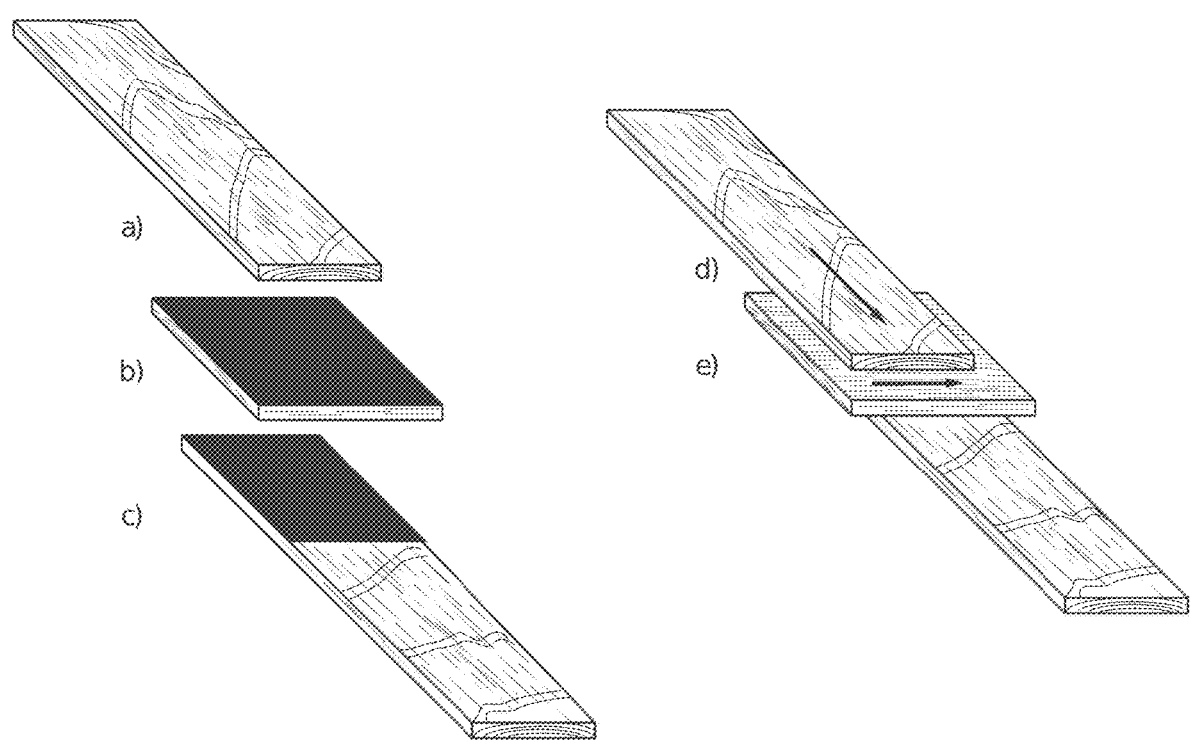
FIG. 2 illustrates test strip configuration used for tensile testing.

The left-hand side of FIG. 2 illustrates application of the ionic liquid. The letters a) to c) refer to: a) top strip; b) middle strip; c) bottom strip. The black colour represents areas, where ionic liquid cellulose solution is applied. The right-hand side shows the assembly after pressing and heating, the reference letters indicating: d) top strip with wood grain lengthwise (illustrated by the arrow), and e) middle strip cross-grains (with wood grain perpendicular to top strip).

Six strips, in groups of two, were pressed between birch blocks using a clamp, and the assembly was kept in a ventilated oven at 150° C. overnight to evaporate the IL, then cooled. The ultimate tensile strength was 0.48 N/mm$^2$ with a maximum at 0.58 N/mm$^2$ for three strips.

Example 4: 0.1829 g of air-dry pulp (7% moisture) was dispersed in 6.64 g acetone, 2.3514 g DBN and 1.1337 g acetic acid was added and the acetone was evaporated in a rotavapor to give a 5% solution of Enocell dissolving pulp in [DBNH]OAc. A piece of the clarified solution was spread on a testing square-strip assembly as in Example 3 and FIG. 2, and the procedure continued with evaporation of the IL as in Example 3. The ultimate tensile strength was 0.07 N/mm$^2$.

Example 5: A 10% solution of Enocell pulp in [DBNH]OAc was produced with the same procedure as in Example 4 from 0.5340 g air-dry Enocell pulp, 13.1292 g acetone, 3.0332 g DBN and 1.4675 g AcOH, spread on the square-strip assembly and the IL evaporated as in Example 4. The strength was 0.86 N/mm$^2$ with a maximum at 1.13 N/mm$^2$ for five strips.

Example 6: Five IL-glued strips were glued with 10% Enocell in [DBNH]OAc as in Example 5. After evaporation of the IL, the strips were boiled for 1 h and dried 1 day in a clamp (to reduce warping) and 2 days in free air. The strength was 0.52 N/mm$^2$ with a maximum at 0.75 N/mm$^2$ for five strips.

Example 7: A 3.3% solution of Enocell pulp in [TMGH]OAc was produced with the same procedure as in Example 4 from 0.2039 air-dry Enocell pulp, 7.12 g acetone, 3.9090 g TMG and 2.0306 g acetic acid, and spread on the testing squares as in Example 3. The solution tended to harden faster than the [DBNH]OAc solution during gluing, thus remelting with a heat gun was required for some of the samples. The IL was evaporated as in Example 3. The strength was 0.11 N/mm$^2$ with a maximum at 0.15 N/mm$^2$ for three strips.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The invention may be used to produce glued wood structures, furniture, plywood, particleboard, medium-density fiber board, hardboard, glued laminated timber, wood flooring, and parquetry, marquetry or other types of intarsia. Furthermore, the invention may be used to produce wood-synthetic polymer composite, straw-synthetic polymer composite, pulp fiber-synthetic polymer composite, including composites with fillers such as inorganic materials such as calcium carbonate, recycled textiles or other reclaimed materials.

ACRONYMS LIST

AcOH acetic acid
DBN 1,5-diazabicyclo[4.3.0]non-5-ene
DBU 1,8-diazabicyclo[5.4.0]undec-7-ene
[DBNH]NTf$_2$ 1,5-diazabicyclo[4.3.0]non-5-enium bis(trifluoromethylsulfonyl)imide
[DBNH]OAc 1,5-diazabicyclo[4.3.0]non-5-enium acetate
[DBUH]MeCO$_3$ 1,8-diazabicyclo[5.4.0]undec-7-enium methylcarbonate [DBUH]OAc 1,8-diazabicyclo[5.4.0]undec-7-enium acetate
[DMPH]OAc 1,2-dimethyl-1,4,5,6-tetrahydropyrimidinium acetate
DWL dissolved wood lignin
EMAL enzymatic mild acidolysis lignin
EtCOOH propionic acid
HNTf$_2$ bis(trifluoromethylsulfonyl)imidic acid
IL ionic liquid
MeOH methanol
[MTBDH]OAc 1-methyl-1,3,4,6, 7, 8-hexahydro-2H-pyrimido [1,2-a]-pyrimidinium acetate
MWL milled wood lignin
THF tetrahydrofuran
TMG 1,1,3,3-tetramethylguanidine [TMGH]OAc 1,1,3,3-tetramethylguanidium acetate
VOC volatile organic compounds

CITATION LIST

Patent Literature

DE102009003011 A1
U.S. Pat. No. 6,824,599
U.S. Pat. No. 3,447,956
U.S. Pat. No. 8,202,379
WO 2008/043837

Non-Patent Literature

Chua, M. G. S. Wayman, M. *Can. J. Chem.*, 57(10):1141-1149, 1979.
Hauru, L., et al. *RSC Adv.*, 3:16365-16373, 2013.
Haverhals, L. M., et al., *Cellulose* 19:13-22, 2012.
Hummel, M., et al., *Green Chem.* 13(9):2507, 2011.
King, A. W. T. et al., *Angew. Chem.* 50:6301-6305, 2011.
King, A. W. T., et al., *RSC Adv.* 2:8020-8026, 2012.
Marsh, K. N. et al., *Fluid Phase Equilib.* 219(1): 93, 2004.
Ostonen, A. *Thermodynamic Study of Protic Ionic Liquids*. D.Sc. thesis, Aalto University, 2017.
Parviainen, A. et al., *ChemSusChem.* 6:2161-2169, 2013.
Phan, L., et al., *Ind. Eng. Chem. Res.* 47(3):539-545, 2008
Swatloski, R. P. et al., *J. Am. Chem. Soc.* 124(18): 4974-4975, 2002
Technical Research Centre of Finland (VTT). *Reactive lignin for reducing the environmental impacts of wood products*. ScienceDaily, 14 Feb. 2017. <www.sciencedaily.com/releases/2017/02/170214094032.htm>

The invention claimed is:
1. A method of joining objects of a hydrophilic polymeric biomaterial to one another, the method comprising:
applying an ionic liquid onto at least one surface of the objects, the at least one surface comprising the hydrophilic polymeric biomaterial; and
pressing the surfaces together to join the objects together, wherein the ionic liquid is selected from the group consisting of:

[DBUH]OAc (1,8-diazabicyclo[5.4.0]undec-7-enium acetate),

[DMPH]OAc (1,2-dimethyl-1,4,5,6-tetrahydropyrimidinium acetate),

[TMGH]OAc (1,1,3,3-tetramethylguanidium acetate),

[MTBDH]OAc (1-methyl-1,3,4,6,7,8-hexahydro-2H-pyrimido[1,2-a]pyrimidinium acetate), corresponding formates or propionates thereof, and mixtures thereof.

2. The method of claim 1, wherein the method further comprises: heating the objects before the evaporation at a temperature lower than a temperature at which the ionic liquid evaporates in a first heating stage; removing the ionic liquid by evaporation at or above the temperature at which the ionic liquid evaporates in a second heating stage; and pressing the surfaces together to join the objects together.

3. The method according to claim 2, further comprising partially or completely removing the ionic liquid from the objects.

4. The method according to claim 2, wherein the ionic liquid has an evaporation temperature greater than 110° C.

5. The method according to claim 2, wherein the ionic liquid is removed by evaporation at atmospheric pressure or lower, by forced convection provided with a hot gas flow, or by vacuum evaporation.

6. The method according to claim 2, wherein the ionic liquid is removed by desolvation and washing with an antisolvent, by ion metathesis, or by decomposing the volatile ionic liquid.

7. The method according to claim 1, wherein the ionic liquid is collected and recycled in the process.

8. The method according to claim 1, wherein the hydrophilic polymeric biomaterial is selected from the group consisting of wood, paper, straw, leather, and combinations thereof.

9. The method according to claim 1, wherein the amount of the ionic liquid added onto the at least one surface is 0.0003 to 10 g/cm$^2$.

10. The method according to claim 1, wherein the ionic liquid is added as a mixture or solution comprising an additional component selected from the group consisting of:
a co-solvent or antisolvent;
excess of a conjugate base or acid;
cellulose;
modified cellulose;
polysaccharides;
polyols;
chitin, chitosan, or modified chitin, silk, or wool;
lignin, modified lignin, or a lignin-derived resin;
pulp, wood or other biomass material pre-swelled and/or pretreated with a water/cosolvent/ionic liquid (IL) mixture;
synthetic polymers;
undissolved fibers;
inorganic modifiers and fillers;
additives to impart resistance to diffusion of oxygen, vapor, or hydrophobic materials;
biocides;
reagents to attack and soften lignin, to acylate or alkylate hydroxyls, to plasticize the biomaterial, or to prevent colourisation; and
combinations thereof.

11. The method according to claim 1, wherein the ionic liquid is applied in a form of a solution, and wherein the solution comprises a gel, a microgel, a suspension, or a physical dispersion.

12. The method according to claim 1, wherein the ionic liquid is added in a solid form and is melted to join the objects.

13. The method according to claim 1, wherein two or more objects composed of the same hydrophilic polymeric biomaterial are joined together.

14. The method according to claim 1, wherein the objects joined together comprise at least a first object and a second object with the first object comprising a different material from that of the second object, the different material selected from the group consisting of hydrophilic polymeric biomaterials, synthetic polymers, and textiles.

15. The method according to claim 1, wherein the ionic liquid is added as a mixture or solution comprising the liquid and a co-solvent.

16. The method according to claim 15, wherein the co-solvent comprises acetone.

17. The method according to claim 1, wherein each of the objects of the hydrophilic polymeric biomaterial is wood.

* * * * *